(12) United States Patent
Widlroither et al.

(10) Patent No.: US 12,059,736 B2
(45) Date of Patent: Aug. 13, 2024

(54) CUTTING GRINDER AND METHOD FOR CUTTING THROUGH A RAIL OF A TRACK

(71) Applicant: ROBEL Bahnbaumaschinen GmbH, Freilassing (DE)

(72) Inventors: Otto Widlroither, Freilassing (DE); Thomas Hoelzlwimmer, Burgkirchen (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 611 days.

(21) Appl. No.: 17/421,552

(22) PCT Filed: Jan. 9, 2020

(86) PCT No.: PCT/EP2020/050453
§ 371 (c)(1),
(2) Date: Jul. 8, 2021

(87) PCT Pub. No.: WO2020/144291
PCT Pub. Date: Jun. 16, 2020

(65) Prior Publication Data
US 2022/0063007 A1 Mar. 3, 2022

(30) Foreign Application Priority Data
Jan. 11, 2019 (DE) .................. 102019200303.6

(51) Int. Cl.
B23D 45/00 (2006.01)
B23D 59/00 (2006.01)
E01B 31/04 (2006.01)

(52) U.S. Cl.
CPC ........ *B23D 45/003* (2013.01); *B23D 45/006* (2013.01); *B23D 59/002* (2013.01); *E01B 31/04* (2013.01)

(58) Field of Classification Search
CPC .... B23D 45/003; B23D 45/04; B23D 45/006; E01B 31/00; E01B 31/04; B24B 27/0084
See application file for complete search history.

(56) References Cited

U.S. PATENT DOCUMENTS

| | | | |
|---|---|---|---|
| 3,583,106 A | 6/1971 | Dobbertin | |
| 4,068,415 A | 1/1978 | McIlrath | |
| 4,156,991 A * | 6/1979 | McIlrath | B23D 45/006 451/347 |
| 5,486,136 A | 1/1996 | Noda | |

(Continued)

FOREIGN PATENT DOCUMENTS

| CA | 2254576 A1 | 5/1999 |
|---|---|---|
| CN | 2146510 Y | 11/1993 |

(Continued)

OTHER PUBLICATIONS

WO-2018097194-A1 translation (Year: 2018).*

(Continued)

*Primary Examiner* — Abbie E Quann
(74) *Attorney, Agent, or Firm* — Laurence A. Greenberg; Werner H. Stemer; Ralph E. Locher

(57) ABSTRACT

A cutting grinder for cutting through a rail of a track includes a detection device for detecting a proposed cutting position. The cutting grinder guarantees simple, user-friendly and efficient through-cutting of the rail.

13 Claims, 6 Drawing Sheets

(56) References Cited

U.S. PATENT DOCUMENTS

| | | |
|---|---|---|
| 6,234,889 B1 | 5/2001 | Huboud Peron |
| 6,314,853 B1 | 11/2001 | Omi et al. |
| 8,998,684 B2 | 4/2015 | Rosani et al. |
| 11,162,228 B2 | 11/2021 | Ericsson |
| 11,539,314 B2 | 12/2022 | Nishimiya et al. |
| 2012/0220202 A1 | 8/2012 | Barezzani et al. |
| 2020/0067435 A1 | 2/2020 | Nishimiya et al. |
| 2021/0246615 A1 | 8/2021 | Gaspard et al. |

FOREIGN PATENT DOCUMENTS

| | | | |
|---|---|---|---|
| CN | 1232106 A | 10/1999 | |
| CN | 102713068 A | 10/2012 | |
| CN | 105164340 A | 12/2015 | |
| CN | 206811708 U | 12/2017 | |
| DE | 102012010077 A1 | 11/2013 | |
| DE | 102019200303 A1 | 7/2020 | |
| EP | 1098037 A2 | 5/2001 | |
| EP | 1098037 B1 | 1/2005 | |
| EP | 2364805 A1 | 9/2011 | |
| JP | 2014233787 A | 12/2014 | |
| JP | 2018083254 A | 5/2018 | |
| WO | 2013187837 A2 | 12/2013 | |
| WO | 2018097194 A1 | 5/2018 | |
| WO | WO-2018097194 A1 * | 5/2018 | ............ B23D 45/16 |
| WO | 2019243756 A1 | 12/2019 | |

OTHER PUBLICATIONS

SNCF Reseau: "Validation Technique Tronconneuse a Rail sur Batterie MTZ B", [Technical validation of the MTZ-B battery-powered rail cutting machine], Aug. 21, 2018.

Geismar: "Tronconneuse de Rails sur Batterie type MTZ-B", [Rail cutting machine on battery type MTZ-B], Aug. 28, 2018, www.geismar.com.

* cited by examiner

CUTTING GRINDER AND METHOD FOR CUTTING THROUGH A RAIL OF A TRACK

BACKGROUND OF THE INVENTION

Field of the Invention

The present patent application claims priority of German patent application DE 10 2019 200 303.6, the content of which is hereby included by reference.

The invention concerns a cutting grinder and a method for cutting through a rail of a track.

When replacing worn rail portions, a rail must be cut through. This is usually done with a manually guided or hand-guided cutting grinder. When cutting through the rail, the problem occurs that this cannot be cut through completely by means of the cutting grinder in a first cutting position because of the dimensions of the rail and of the cutting disc used. Therefore, the cutting grinder must be transferred from the first cutting position, in which the cutting grinder is arranged on a first side of a rail symmetry plane, into a second cutting position in which the cutting grinder is arranged on a second side of the rail symmetry plane. In the second cutting position, the rail can then be completely cut through.

SUMMARY OF THE INVENTION

The invention is based on the object of creating a cutting grinder which allows cutting through of a rail of a track in a simple, user-friendly and efficient fashion.

This object is achieved by a cutting grinder for cutting through a rail of a track, with a base body, a drive for driving a cutting disc in rotation about a rotational axis, and at least one handle for manually guiding the cutting grinder, comprising a detection device for detecting cutting positions of the cutting grinder, and comprising a control unit for setting a rotational direction of the drive depending on the respective detected cutting position. The detection device allows automatic detection of the respective cutting position. The detection device is preferably arranged on the base body. This allows the rotational direction of the drive to be reversed in a simple and user-friendly fashion when the cutting positions are changed. Uncontrolled spark emission when cutting through the rail is avoided in a simple and user-friendly fashion. By detection of the respective cutting position, a rapid reversal of the rotational direction of the drive is possible so that the cutting of the rail can be continued efficiently.

The control unit allows automatic setting of the rotational direction of the drive depending on the respective detected cutting position, so that after a change of cutting position, the rotational direction of the drive is reversed automatically. This avoids an uncontrolled spark emission in a simple and user-friendly fashion so that cutting can be continued efficiently after a change of cutting position. The control unit is in signalling connection with contact switches and/or at least one sensor for detecting the respective cutting position.

A cutting grinder comprising an adjustment device for adjusting the at least one handle depending on the cutting positions of the cutting grinder guarantees a simple, user-friendly and efficient through-cutting of the rail. The adjustment device here allows the at least one handle to be adapted to the cutting positions on both sides of a rail symmetry plane. In this way, the cutting grinder can be manually transferred to the respective cutting position in a simple and user-friendly fashion. The adjustment device also allows optimum ground clearance on manual guidance of the cutting grinder and when cutting through the rail, so that cutting is possible in a comparatively efficient fashion.

In the first cutting position, the cutting grinder is arranged on a first side of the rail symmetry plane. In the first cutting position, a first side of the base body faces away from a ballast bed of the track, and a second side of the base body faces the ballast bed. The second side of the base body is arranged opposite the first side. In the first cutting position, the at least one handle is arranged in a first adjustment position. In contrast, in the second cutting position, the cutting grinder is arranged on a second side of the rail symmetry plane opposite the first side. In the second cutting position, the second side of the base body faces away from the ballast bed and the first side of the base body faces the ballast bed. In the second cutting position, the at least one handle is arranged in a second adjustment position.

The at least one handle is preferably arranged on the adjustment device. The adjustment device is preferably arranged on the base body.

The cutting grinder according to the invention, together with the adjustment device, may in particular also constitute an autonomous invention which is independent of the detection device.

A cutting grinder, in which the adjustment device is arranged so as to be displaceable on the base body, guarantees a simple, user-friendly and efficient through-cutting of the rail. The at least one handle can be adjusted in a simple and user-friendly fashion and adapted to the respective cutting position by displacement of the adjustment device. Preferably, the adjustment device is at least partially pivotable and or linearly displaceable relative to the base body. The at least one handle is attached to the adjustment device and displaceable therewith.

A cutting grinder, in which the adjustment device has a carrier frame which is pivotable about a pivot axis relative to the base body, guarantees a simple, user-friendly and efficient through-cutting of the rail. The at least one handle is attached to the carrier frame. The carrier frame is preferably mounted on the base body by at least one pivot bearing. By pivoting the carrier frame about the pivot axis, the at least one handle is transferred from a first adjustment position to a second adjustment position and vice versa. Preferably, the pivot axis runs substantially parallel to the rotational axis of the drive.

A cutting grinder, in which a first handle for manually guiding the cutting grinder in a first cutting position and a second handle for manually guiding the cutting grinder in a second cutting position are attached to the adjustment device, guarantees a simple, user-friendly and efficient through-cutting of the rail. The base body defines a base body plane which runs through the base body and the rotational axis. The handles are preferably arranged on different sides of the base body plane. Preferably, the handles are displaceable jointly. In particular, the handles are displaceable by means of the adjustment device such that the one handle is moved towards the base body plane while at the same time the other handle is moved away from the base body plane.

A cutting grinder, in which the adjustment device is constructed symmetrically relative to a symmetry plane, guarantees a simple, user-friendly and efficient through-cutting of the rail. The symmetrical structure of the adjustment device means that the cutting disc can be guided and operated in the same fashion in the cutting positions. Preferably, the symmetry plane runs through a pivot axis of the adjustment device.

A cutting grinder, in which a first handle and a second handle are arranged on the adjustment device on different sides of the base body, guarantees a simple, user-friendly and efficient through-cutting of the rail. Because the handles are arranged on different sides of the base body or a base body plane which runs through the base body and the rotational axis, the cutting grinder can be guided manually by means of a respective handle in each of the cutting positions. The adjustment device allows optimum ground clearance from a ballast bed of the track in the respective cutting position and ensures simple guidance by means of the respective handle.

A cutting grinder comprising a locking unit for locking the adjustment device in a first adjustment position and in a second adjustment position guarantees a simple, user-friendly and efficient through-cutting of the rail. The locking device serves in particular for locking a carrier frame of the adjustment device on which the at least one handle, preferably a first handle and the second handle, is/are arranged. The locking unit preferably allows stepless and/or stepped adjustment of the at least one handle. Preferably, the locking device comprises a clamping element, preferably a screw lever. The clamping element is guided in particular in a groove or recess of the carrier frame. Preferably, the carrier frame is mounted on both sides of the base body by means of a pivot bearing and by means of the locking unit.

A cutting grinder, in which the adjustment device forms a first stop in a first adjustment and a second stop in a second adjustment position, guarantees a simple, user-friendly and efficient through-cutting of the rail. The stops allow simple and rapid adjustment of the at least one handle. Preferably, the stops are formed by at least one guide bolt which is guided in at least one guide groove or guide recess. The respective guide groove or guide recess is for example formed in a carrier frame of the adjustment device and the respective guide bolt is attached to the base body.

A cutting grinder, in which the adjustment device is mounted on opposite sides of the base body, guarantees a simple, user-friendly and efficient through-cutting of the rail. The adjustment device preferably comprises a carrier frame with a first carrier frame part and a second carrier frame part, which are mounted on opposite sides of the base body and connected together by means of the at least one handle, in particular by means of the first handle and the second handle. Preferably, the first carrier frame part is mounted on one side of the base body by means of a pivot bearing, and the second carrier frame part is mounted on an opposite side by means of a locking unit.

A cutting grinder, in which the detection device comprises at least one first contact switch for detecting a first cutting position and at least one second contact switch for detecting a second cutting position, guarantees a simple, user-friendly and efficient through-cutting of the rail. The contact switches are in particular arranged such that they can be actuated by means of the at least one handle and/or the adjustment device. By adjustment of the at least one handle and/or the adjustment device, automatically one of the contact switches is actuated and hence the cutting position proposed for cutting is detected. Alternatively or additionally, manual actuation of at least one contact switch, in particular two contact switches, may be provided for detecting the proposed cutting position and/or confirming the detected cutting position. The contact switches are preferably arranged on opposite sides of the base body.

A cutting grinder, in which the detection device comprises at least one sensor for detecting a first cutting position and for detecting a second cutting position, guarantees a simple, user-friendly and efficient through-cutting of the rail. The at least one sensor automatically detects the respective cutting position. The at least one sensor is designed, for example, as an acceleration sensor, optical sensor and/or gravity sensor or electronic plummet.

The invention is furthermore based on the object of creating a method which allows through-cutting of a rail of a track in a simple, user-friendly and efficient fashion.

Accordingly, in another aspect, the invention provides a method for cutting through a rail of a track, with the steps:
providing a cutting grinder according to the invention,
partially cutting through a rail by means of the cutting grinder, wherein the cutting grinder is manually guided in a first cutting position on a first side of a rail symmetry plane,
transferring the cutting grinder from the first cutting position to a second cutting position on a second side of the rail symmetry plane,
detecting the cutting position by means of the detection device, and
completely cutting through the rail by means of the cutting grinder, wherein the cutting grinder is manually guided in the second cutting position on the second side of the rail symmetry plane, and the rotational directions of the drive in the cutting positions are reversed. The advantages of the method according to the invention correspond to the advantages already described of the cutting grinder according to the invention. The automatic reversal of the rotational direction allows efficient continuation of the rail cutting. The rotational direction is set depending on the respective detected cutting position, for example a first rotational direction in the first cutting position and an opposite, second rotational direction in the second cutting position.

A method that comprises an adjustment of the at least one handle by means of the adjustment device guarantees a simple, user-friendly and efficient through-cutting of the rail. The method for cutting through a rail may constitute an autonomous invention, independently of detection of the cutting position by means of the detection device and the reversed setting of the rotational directions of the drive in the cutting positions, wherein said invention is characterized by the adjustment device and the adjustment of the at least one handle.

Further features, advantages and details of the invention arise from the following description of an exemplary embodiment. The drawings show:

DETAILED DESCRIPTION OF THE INVENTION

Figure 1:
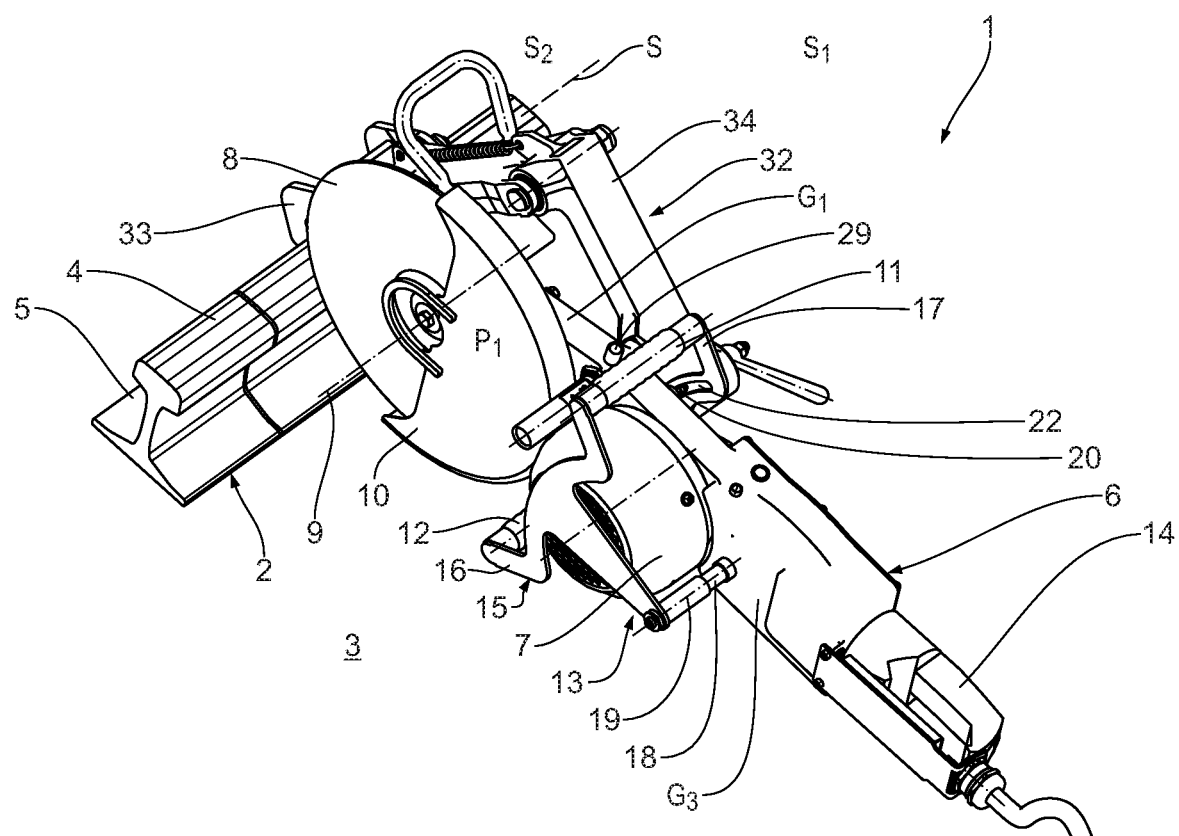
FIG. 1 a perspective view of a cutting grinder in a first cutting position when cutting through a rail of a track, wherein a guide device of the cutting grinder is attached to the rail, FIG. 2 a first side view of the cutting grinder from FIG. 1, FIG. 3 a second side view of the cutting grinder from FIG. 1 without the rail and the guide device, FIG. 4 a top view of the cutting grinder from FIG. 1, FIG. 5 a side view of the cutting grinder in a second cutting position when cutting through the rail, and FIG. 6 a perspective view of the cutting grinder from FIG. 5 without the rail and the guide device.

The cutting grinder 1 shown in FIGS. 1 to 6 serves for cutting through a rail 2 of a track. The rail 2 is attached to sleepers (not shown in detail) which are arranged on a ballast bed 3. The rail 2 has a rail head 4 and rail foot 5. The rail 2 is formed substantially symmetrically in cross-section relative to a rail symmetry plane S. The rail symmetry plane S divides a working space for cutting through the rail 2 into a first side $S_1$ and a second side $S_2$.

Figure 5:
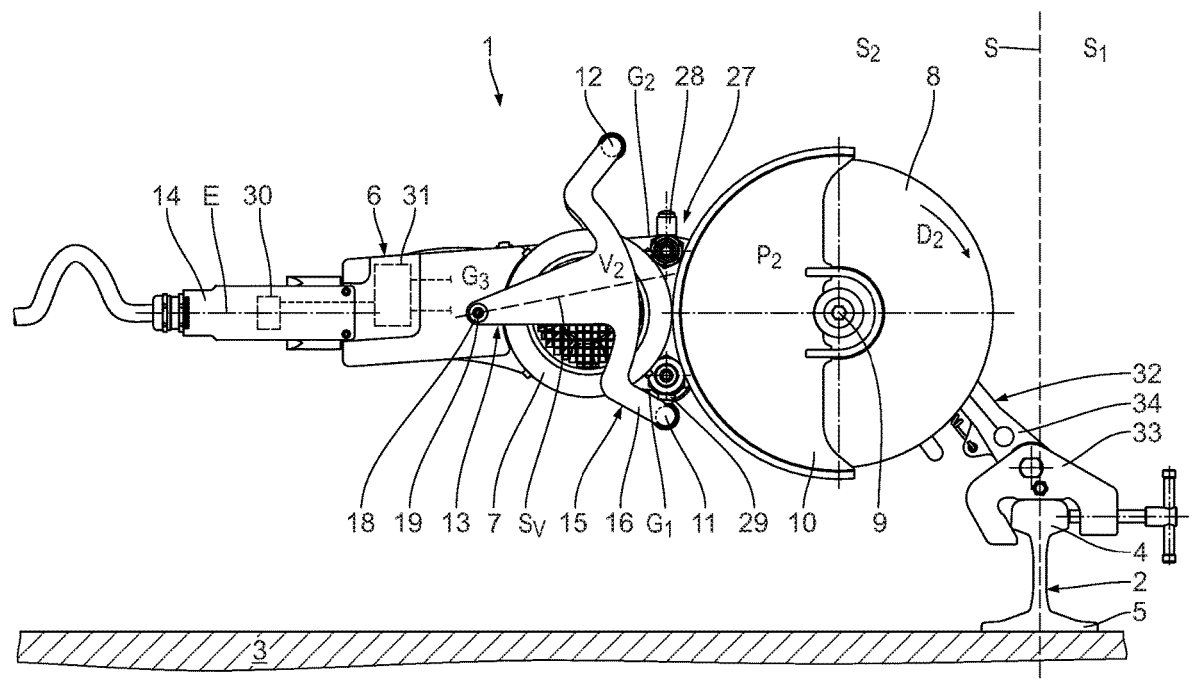
Figure 6:
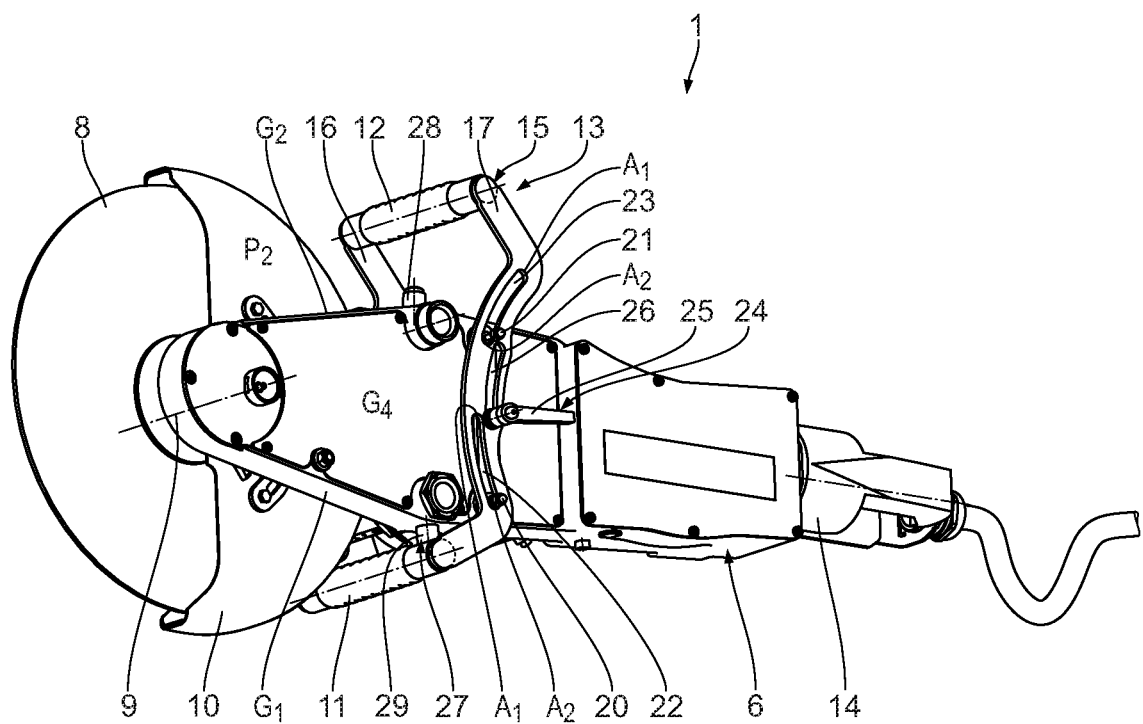

FIGS. 1 to 4 show the cutting grinder 1 in a first cutting position $P_1$ in which the cutting grinder 1 is arranged on the first side $S_1$ of the rail symmetry plane S. In contrast, FIGS. 5 and 6 show the cutting grinder 1 in a second cutting position $P_2$ in which the cutting grinder 1 is arranged on the second side $S_2$ of the rail symmetry plane S.

The cutting grinder 1 comprises a base body 6 on which a drive 7 is arranged for driving a cutting disc 8 in rotation about a rotational axis 9. The drive 7 is formed as an electric drive motor. The cutting disc 8 is attached to the cutting grinder 1 in the usual fashion. The drive 7 drives the cutting disc 8 via a transmission mechanism (not shown in detail). The transmission mechanism comprises for example a transmission chain or a transmission belt. In order to control the spark emission and protect an operator, a spark protection 10 is arranged on the base body 6.

For manual guidance, the cutting grinder 1 has a first handle 11 and a second handle 12. The handles 11, 12 are attached to an adjustment device 13 which is arranged displaceably on the base body 6 for adjustment of the handles 11, 12 depending on the cutting positions $P_1$, $P_2$. FIGS. 1 to 4 show the adjustment device 13 and the handles 11, 12 in an adjustment position $V_1$, whereas FIGS. 5 and 6 show the adjustment device 13 and handles 11, 12 in a second adjustment position $V_2$. For manual guidance, the cutting grinder 1 has a third handle 14 which is arranged on the end of the base body 6. The first handle 11 and the third handle 14 serve for manual guidance of the cutting grinder 1 in the first cutting position $P_1$. Correspondingly, the second handle 12 and the third handle 14 serve for manual guidance of the cutting grinder 1 in the second cutting position $P_2$.

The base body 6 defines a base body plane E which runs through the base body 6 and the rotational axis 9. The handles 11, 12 are arranged on different sides of the base body plane E. The first handle 11 faces a side $G_1$ of the base body 6, while the second handle 12 faces a side $G_2$ which lies opposite side $G_1$ on the base body 6.

The adjustment device 13 comprises a carrier frame 15 with a first carrier frame part 16 and a second carrier frame part 17. The first carrier frame part 16 is mounted on the base body 6 by means of a pivot bearing 18 so as to be pivotable about a pivot axis 19. The pivot axis 19 runs substantially parallel to the rotational axis 9 in the base body plane E. The pivot bearing 18 is attached to a side $G_3$ of the base body 6. Side $G_3$ is arranged between sides $G_1$ and $G_2$.

The second carrier frame part 17 is connected to the first carrier frame part 16 by means of the handles 11, 12 so that the base body 6 is arranged between the carrier frame parts 16, 17. The carrier frame parts 16, 17 and the handles 11, 12 can thus be pivoted jointly about the pivot axis 19. The second carrier frame part 17 is mounted pivotably on a side $G_4$ of the base body 6 by means of guide bolts 20, 21 and associated guide grooves 22, and a locking unit 24. Side $G_4$ is arranged between sides $G_1$ and $G_2$ and opposite side $G_3$. The guide bolts 20, 21 are arranged spaced apart from each other on side $G_4$ of the base body 6 and adjacent to side $G_1$ or $G_2$ respectively. The guide grooves 22, 23 are formed in the second carrier frame part 17. The guide bolt 20 is guided in the guide groove 22, while the guide bolt 21 is guided in the guide groove 23. The adjustment device 13 or the carrier frame 15 is thus mounted on the base body 6 on the opposite sides $G_3$, $G_4$.

The guide bolts 20, 21 in the first adjustment position $V_1$ form first stops $A_1$ for the carrier frame 15, while the guide bolts 20, 21 in the second adjustment position $V_2$ form second stops $A_2$. The carrier frame 15 is thus pivotable about the pivot axis 19 between the stops $A_1$ and $A_2$.

The locking unit 24 comprises a clamping element 25 which is guided in a groove 26. The clamping element 25 is arranged on side $G_4$ of the base body 6. The groove 26 is formed in the second carrier frame part 17. By means of the clamping element 25, the adjustment device 13 or the carrier frame 15 can be locked or fixed in the adjustment positions $V_1$ and $V_2$ and in any arbitrary intermediate position.

The adjustment device 13 is constructed substantially symmetrically relative to a symmetry plane $S_V$. The symmetry plane $S_V$ runs through the pivot axis 19 and between the handles 11, 12. The handles 11, 12 are arranged parallel to the symmetry plane $S_V$.

For automatic detection of the cutting positions $P_1$, $P_2$, the cutting grinder 1 has a detection device 27. The detection device 27 comprises a first contact switch 28 and a second contact switch 29. The first contact switch 28 is arranged on the side $G_2$ of the base body 6 and faces the second handle 12. In contrast, the second contact switch 29 is arranged on side $G_1$ of the base body 6 and faces the first handle 11. The detection device 27 serves for detecting the first cutting position $P_1$ when the second handle 12 in the first adjustment position $V_1$ actuates the first contact switch 28, and for detecting the second cutting position $P_2$ when the first handle 11 in the second adjustment position $V_2$ actuates the second contact switch 29. This is illustrated for example in FIGS. 2 and 5.

The detection device 27 furthermore comprises a sensor 30 for detecting the cutting positions $P_1$, $P_2$. The sensor 30 is arranged on the base body 6. In the exemplary embodiment shown, the sensor 30 is integrated in the third handle 14. The sensor 30 is configured for example as an acceleration sensor, an optical sensor or gravity sensor.

The detection device 27 comprises a control unit 31. The control unit 31 is integrated in the base body 6. The control unit 31 is in signalling connection with the contact switches 28, 29 and the sensor 30. The control unit 31 serves for detecting the cutting positions $P_1$, $P_2$ for actuation of the drive 7, and for setting a rotational direction $D_1$ or $D_2$ depending on the detected cutting position $P_1$ or $P_2$.

For precise through-cutting of the rail 2, the cutting grinder 1 has a guide device 32. The guide device 32 comprises a clamping unit 33 and an articulated arm 34 pivotably attached thereto. The articulated arm 34 is itself pivotably arranged on the base body 6.

Figure 2:
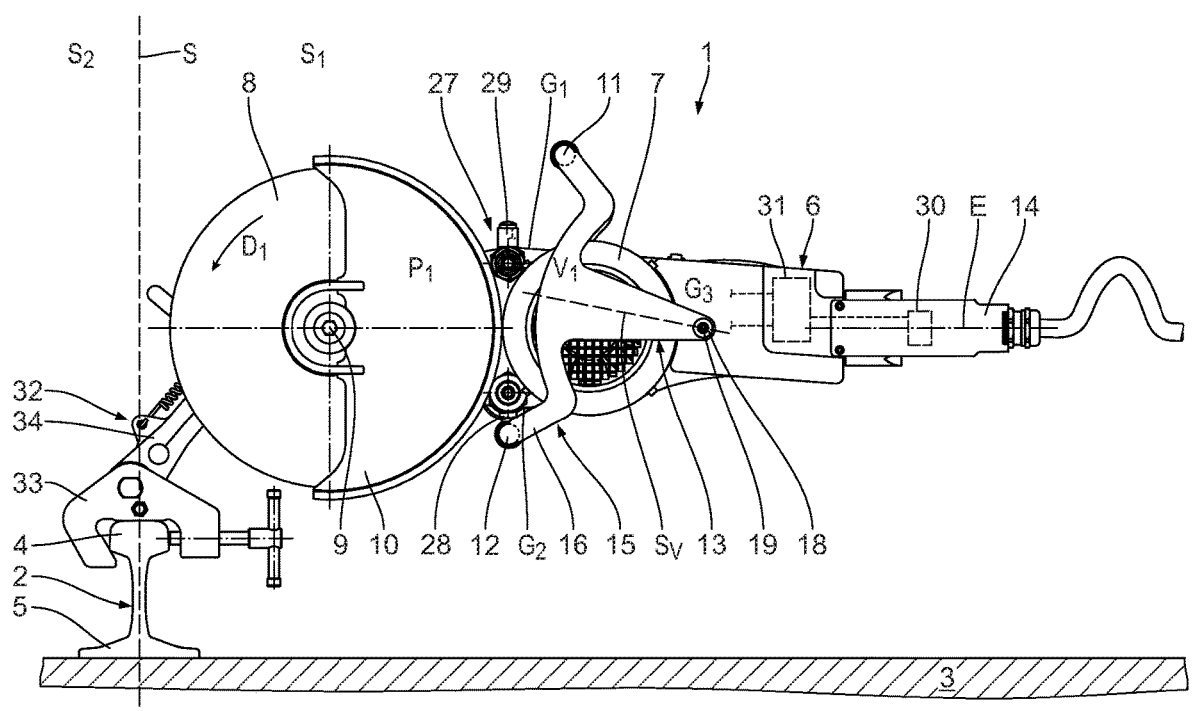
Figure 3:
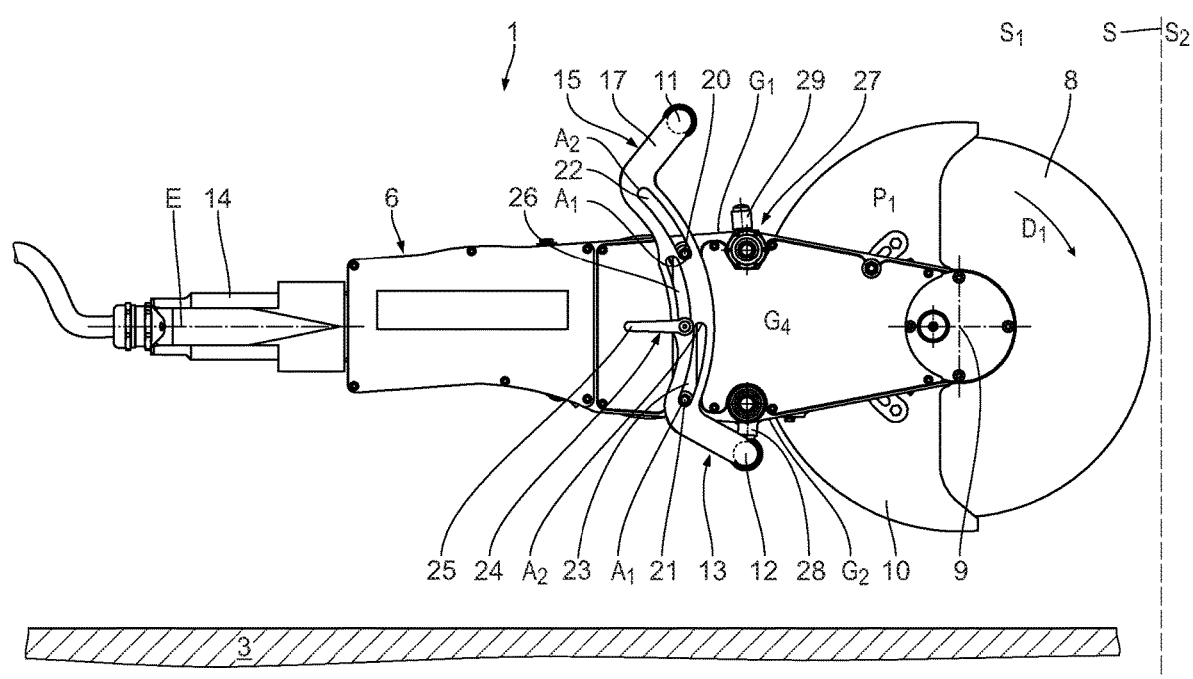
Figure 4:
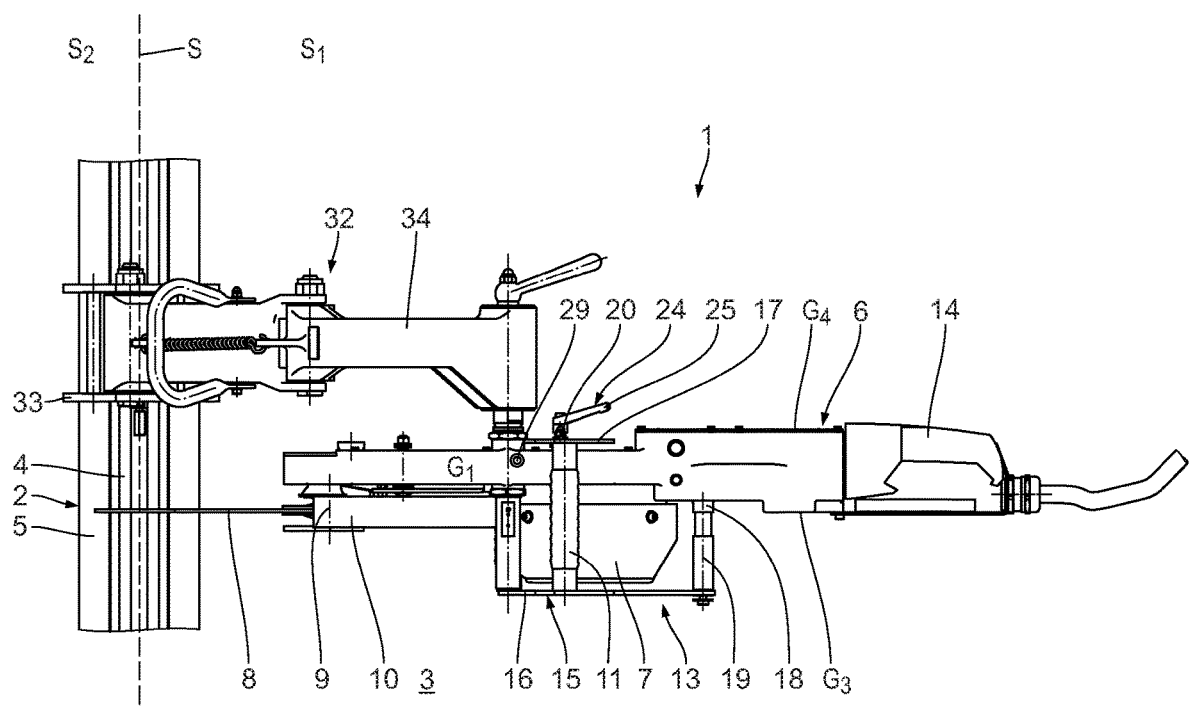

The function of the cutting grinder 1 is as follows:

The cutting grinder 1 is attached to the rail 2 to be cut by means of the clamping unit 33. The adjustment device 13 is in the first adjustment position $V_1$ so that the second handle 12 actuates the first contact switch 28. The control unit 31 evaluates a first signal of the first contact switch 28 and a second signal of the sensor 30. By means of the control unit 31, from the provided signals, the detection device 27 detects that the cutting grinder 1 is in the first cutting position $P_1$. When the cutting grinder 1 is switched on by an operator in the first cutting position $P_1$, the control unit 31 actuates the drive 7 such that the cutting disc 8 is driven in rotation about the rotational axis 9 in the rotational direction $D_1$. This is illustrated in FIG. 2.

By means of the handles 11 and 14, an operator guides the cutting grinder 1 to the rail 2 and cuts through the rail head 4 and partially through the rail foot 5. The guide device 32 here guarantees a precise through-cutting of the rail 2. The rail foot 5 cannot be cut through completely in the first cutting position $P_1$ because of its dimensions and the dimensions of the cutting disc 8.

To cut through the rail 2 completely, the cutting grinder 1 is pivoted manually by means of the guide device 32 over the rail head 4 and through the rail symmetry plane S into the second cutting position $P_2$, in which the cutting grinder 1 is arranged on the second side $S_2$ of the rail symmetry plane S.

To pivot the adjustment device 13, the operator first releases the locking unit 24. Then the adjustment device 13 is pivoted by the operator about the pivot axis 19 so that the first handle 11 in a second adjustment position $V_2$ actuates the second contact switch 29. The locking unit 24 is relocked in the second adjustment position $V_2$. The second contact switch 29 supplies a first signal to the control unit 31, and the sensor 30 supplies a second signal. From the signals, the detection device 27 recognizes, by means of the control unit 31, that the cutting grinder 1 is now in the second cutting position $P_2$. When the cutting grinder 1 is switched on by an operator in the second cutting position $P_2$, the control unit 31 actuates the drive 7 such that the cutting disc 8 is driven in rotation about the rotational axis 9 in the rotational direction $D_2$. The rotational direction $D_2$ is reversed relative to the rotational direction $D_1$. This is illustrated in FIG. 5. In the second cutting position $P_2$, the cutting grinder 1 is manually guided by means of the handles 12 and 14. The rail 2 is completely cut through by the operator in the second cutting position $P_2$. The guide device 32 here guarantees a precise cutting of the rail 2.

The adjustment device 13 and/or the detection device 27 guarantee a simple, user-friendly and efficient through-cutting of the rail 2. The adjustment device 13 allows optimum ground clearance between the cutting grinder 1 and the ballast bed 3. Alternatively or additionally to the contact switches 28, 29 and/or the sensor 30, the cutting grinder 1 may have further contact switches which must be operated manually by an operator in order to confirm a detected cutting position $P_1$, $P_2$. If a cutting position $P_1$, $P_2$ detected by the sensor 30 is not correctly confirmed by the contact switches 28, 29 or further contact switches, the control unit 31 prevents actuation of the drive 7. The drive 7 is therefore not started. The handles 11, 12 function in opposite fashion, so that in each of the cutting positions $P_1$, $P_2$ the handles 11, 12 guarantee an ergonomic working position of the operator and optimum ground clearance from the ballast bed 3. The locking unit 24 can easily be released and relocked after the handles 11, 12 have been adjusted. The adjustment may be stepless or stepped. The locking unit 24 may be configured to function by form fit and/or force fit.

The invention claimed is:

1. A cutting grinder for cutting through a rail of a track, the cutting grinder comprising: a base body; a drive for driving a cutting disc in rotation about a rotational axis; at least one handle for manually guiding the cutting grinder; a detection device including at least one sensor for detecting a first cutting position in which the cutting grinder is disposed on a first side of a rail symmetry plane, and for detecting a second cutting position in which the cutting grinder is disposed on a second side of the rail symmetry plane; and a control unit for setting a rotational direction of said drive in dependence on a respective cutting position detected by said detection device.

2. The cutting grinder according to claim 1, further comprising an adjustment device for adjusting said at least one handle depending on the cutting positions of the cutting grinder.

3. The cutting grinder according to claim 2, wherein said adjustment device is arranged so as to be displaceable on said base body.

4. The cutting grinder according to claim 2, wherein said adjustment device has a carrier frame which is pivotable about a pivot axis relative to said base body.

5. The cutting grinder according to claim 2, wherein said at least one handle includes a first handle for manually guiding the cutting grinder in a first cutting position and a second handle for manually guiding the cutting grinder in a second cutting position, and wherein said first and second handles are attached to said adjustment device.

6. The cutting grinder according to claim 2, wherein said adjustment device is constructed symmetrically relative to a symmetry plane.

7. The cutting grinder according to claim 2, wherein said at least one handle includes a first handle and a second handle arranged on said adjustment device on mutually different sides of said base body.

8. The cutting grinder according to claim 2, comprising a locking unit for locking said adjustment device in a first adjustment position and in a second adjustment position.

9. The cutting grinder according to claim 2, wherein said adjustment device forms a first stop in a first adjustment position and a second stop in a second adjustment position.

10. The cutting grinder according to claim 2, wherein said adjustment device is mounted on opposite sides of said base body.

11. The cutting grinder according to claim 1, wherein said detection device comprises at least one first contact switch for detecting the first cutting position and at least one second contact switch for detecting the second cutting position.

12. A method of cutting through a rail of a track, the method comprising the following steps: providing a cutting grinder with a base body, a drive for driving a cutting disc in rotation about a rotational axis, at least one handle for manually guiding the cutting grinder, a detection device including at least one sensor for detecting a first cutting position in which the cutting grinder is disposed on a first side of a rail symmetry plane, and for detecting a second cutting position in which the cutting grinder is disposed on a second side of the rail symmetry plane, and a control unit for setting a rotational direction of the drive depending on the first or second cutting position; partially cutting through the rail with the cutting grinder, and thereby manually guiding the cutting grinder in the first cutting position on the first side of the symmetry plane of the rail; transferring the cutting grinder from the first cutting position to the second cutting position on the second side of the symmetry plane of the rail; detecting the cutting position by the detection device; and completely cutting through the rail with the cutting grinder, and thereby manually guiding the cutting grinder in the second cutting position on the second side of the symmetry plane of the rail, and reversing the rotational direction of the drive between the first and second cutting positions.

13. The method according to claim 12, which comprises adjusting the at least one handle by way of an adjustment device.

* * * * *